2,918,929

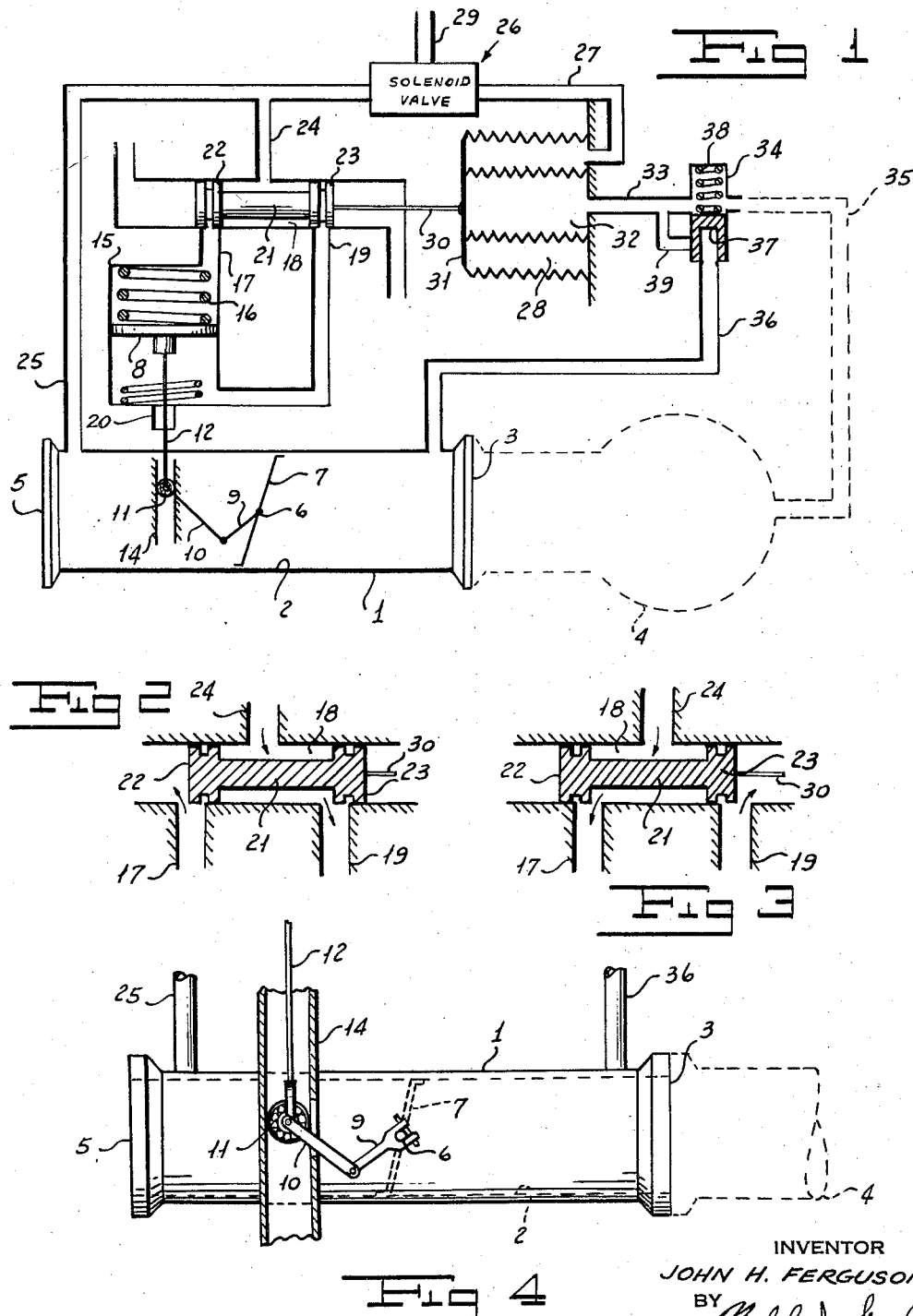

AIR PRESSURE REGULATING AND SHUT-OFF VALVE

John H. Ferguson, Jr., Hillsdale, N.J., assignor to Bendix Aviation Corporation, Teterboro, N.J., a corporation of Delaware Application March 24, 1955, Serial No. 496,547

1 Claim. (Cl. 137—18)

This invention pertains to a novel and improved type of air pressure regulating and shut-off valve which, though subject to wide application, finds particular use in association with a pneumatic type turbine starter. The general function of the valve is to regulate the pressure of air flowing to a pneumatic type starter.

A general object of the invention is a novel and improved type of air pressure control valve for the foregoing purposes.

The valve embodying the invention is of a butterfly type, controlled in its movements by a pneumatically operated piston.

A feature of the invention is provided by the novel structure of linkage associating the butterfly valve element of the device with the piston.

Another feature lies in servo control mechanism influenced by pressure air forces in controlling the movements of the piston so as to provide a regulated movement of the butterfly valve element of the device and, as a consequence, a regulated pressure of air flowing through the valve.

A further feature of the device lies in its particular combination and association with a pneumatic starter in controlling the pressure of air to be applied to the latter.

A still further feature is a secondary or safety air pressure controlling means for effecting control of the valve when the situation so requires.

The invention further lies in the particular construction thereof, as well as in the general organization and cooperative association of its various elements.

The foregoing and other objects and advantages of this invention will appear more fully hereinafter from a consideration of the detailed description which follows, taken together with the accompanying drawings wherein an embodiment of the invention is illustrated by way of example. It is to be expressly understood, however, that the drawing is for illustration purposes only and is not to construed as defining the limits of the invention.

In the drawings:

Fig. 1 is a schematic showing of an air pressure control valve embodying the invention, and illustrated in association with a pneumatic starter;

Fig. 2 illustrates the servo valve in position venting to atmosphere the upper end of the drive piston cylinder.

Fig. 3 illustrates the servo valve in position venting to atmosphere the lower end of the drive piston; and Fig. 4 is a detail of the butterfly valve and the linkage associating it with the drive piston.

In the drawings there is disclosed in a tubular body 1 a cylindrical passage 2 that is connectable in a suitable manner at an outlet end 3 with a pneumatic driven device, such as the starter mechanism 4 which may be of the air driven turbine type. Passage 2 is connectable at its opposite or inlet end 5 with a source, not shown, of variable pressure air. Carried within passage 2 on a cross shaft 6 is a butterfly valve 7. When the latter is turned in a clockwise direction (Figs. 1, 4) by shaft 6, it serves to progressively open passage 2 to air flow from the inlet through to the outlet end. As the butterfly valve is returned to sealing position, the flow through passage 2 is progressively diminished.

The butterfly valve is caused to move from and back to closing position by a pneumatically driven piston 8 associated with the cross shaft 6. The latter shaft is turnable by a connected arm 9 linked by a member 10 to a ball bearing 11. Bearing 11 is rotatably mounted to an end of a piston rod 12 and rides in a track 14 accordingly as it is carried in one direction or the other by the piston rod. Piston 8 is mounted to the opposite end of rod 12 and is reciprocable in a cylinder 15. The bottom end of the cylinder provides a dash pot 20 to cushion movement of the piston. A spring load 16, acting through the top end of piston 8 and the linkage to the butterfly valve, normally holds the latter in closed position. The upper end of piston cylinder 15 communicates through a port 17 with a servo valve chamber 18; and the bottom end of the cylinder communicates with chamber 18 through a passage ported at 19.

Reciprocable in chamber 18 is a pilot piston or servo valve 21 having a land 22 at one end and a land 23 at the opposite end. In the null position (Fig. 1), lands 22, 23, respectively, seal ports 17 and 19 from chamber 18. The latter chamber vents at opposite ends to atmosphere, and communicates from its mid-area by a line 24 with a line 25 tapped off from the inlet end upstream of passage 2. Tap line 25 communicates through a solenoid controlled valve 26 and a line 27 with a bellows 28. Solenoid valve 26 in its normally deenergized condition seals bellows line 27 off from a vent line 29, and communicates the bellows line 27 with the tap line 25. When energized, valve 26 seals the tap line 25 off from the bellows line 27 and opens the latter to vent. The servo valve 21 is connected at one end by a rod 30 to an end plate 31 of the bellows. A second bellows 32 centrally of bellows 28 is mechanically attached to the latter and is normally at atmospheric pressure. It communicates by a line 33 through the mid portion of a piston chamber 34 with a line 35 tapped off the inlet manifold of the associated starter 4, shown in broken line.

The bottom end of piston chamber 34 connects by a line 36 tapped off the downstream side of passage 2. A piston block 37 held by a spring load 38 to the bottom end of chamber 34 normally seals off communication of line 36 with a lateral line 39 that leads from the lower side of chamber 34 to the inner bellows line 33.

In the operation of the device, energization of solenoid valve 26 closes tap line 25 from the bellows line 27 and vents the latter to atmosphere of any pressure air that may be therein. When bellows 28 and 32 are at atmospheric pressure, the servo valve has a position (Fig. 2) wherein the upper end of piston cylinder 15 is vented through port 17 to atmosphere and the lower end of the cylinder is in communication through port 19 with tap line 25. As pressure of air admitted to the upstream side of passage 2 builds up, it also builds up in tap line 25. The pressure of air flowing over tap line 25 and port 19 moves piston 8 upwards. The latter, acting through the linkage associated with the piston rod, turns the butterfly valve clockwise to open position and allows pressure air to flow through passage 2 to the turbine of the associated starter 4. As the air pressure, in the starter and inlet manifold thereof, builds up to a rated value, the pressure acts over the manifold tap line 35 to cause the inner bellows 32 to effect a leftward movement of the servo valve to a balanced or null position wherein the lands of the servo valve register with their respective ports 17 and 19. As the servo valve moves leftward, it progressively cuts down air flow through cylinder port 19; and the spring load 16 tends to return the butterfly valve progressively toward closed position. The latter action progressively cuts down the pressure of air applied through the valve to the turbine starter. The null position (Fig. 1) represents a balanced operating condition wherein there exists a desired pressure of air flowing through the butterfly valve to the starter. Now, should the air pressure in the inlet manifold line 35 increase beyond a rated maximum, the increased air pressure acting upon the bellows 32 will cause the servo valve to move further leftward, as in Fig. 3, beyond the null position, wherein the lower end of the drive piston cylinder becomes vented through port 19 and the upper end is communicated with the inlet tap line 25. Whereupon, pressure air fed to the top of the drive piston 8 drives the latter downward, causing a further closing of the butterfly valve and a consequent lower pressure in the air applied to the starter.

By this arrangement, it is clear that any change in air pressure in the line 35 causes a shift in the position of the servo valve, resulting in pressure air being fed into the top or bottom, as the case may be, of the drive piston cylinder. Accordingly as the air pressure in line 35 changes, the pilot or servo valve will oscillate back and forth over ports 17 and 19, resulting in a regulated pressure air feed through the butterfly valve to the starter.

A secondary or safety automatic pressure control is provided in the event the manifold tap line 35 is accidentally left off or breaks. Excessive air pressure building up on the downstream side of passage 2 will act over the safety line 36 to move the piston block 37 against the load of spring 38 free of line 39, and will actuate the inner bellows 32 to control the movement of the servo valve.

Shut-off control is enabled by de-energizing the solenoid controlled valve 26, whereupon bellows line 27 is closed to vent 29 and opened to the pressure supply tap line 25. This action effects through the bellows 28 leftward movement of the servo valve to communicate the upper end of the drive piston cylinder with supply tap line 25. As the piston 8 moves down, the butterfly closes. The extra area of bellows 28 over bellows 32 holds the servo valve in this position even though pressure in bellows 32 falls to atmospheric condition.

While an embodiment of the invention has been illustrated and described in detail, it is to be expressly understood that the invention is not limited thereto. Various changes can be made in the design and arrangement of the parts without departing from the spirit and scope of the invention, as the same will now be understood by those skilled in the art, and it is my intent to claim the invention not only as shown and described, but also in all such forms and modifications thereof as may be reasonably construed to be within the spirit of the invention and the scope of the appended claim.

What is claimed is:

An air pressure regulating means for use with a pneumatic starter comprised of passage means including a butterfly valve for passing variable-pressure air to said starter, said butterfly valve being operably connected to piston motor means having a piston, said piston being spring-biased so as to close said butterfly valve, servo valve means connected to said passage means upstream of said butterfly valve and arranged to provide air to each side of said piston means for moving said piston and hence said butterfly valve, pneumatic control means including a first bellows and a second bellows, said first bellows being concentric around said second bellows, said first and second bellows having a common end plate connected to said servo valve means for adjusting said servo valve means and hence said spring-biased piston, said second bellows being continuously connected to said passage means downstream of said butterfly valve and being constructed to operate said servo valve means so that said butterfly valve is adjusted to provide a predetermined pressure downstream thereof, said first bellows being connected by passage means including a solenoid control valve arranged when deenergized to connect said first bellows to said passage means upstream of said butterfly valve, said first bellows being arranged to cause said servo valve and said piston means to close said butterfly valve when said first bellows is connected to said passage means upstream of said butterfly valve by operation of said control valve.

References Cited in the file of this patent

UNITED STATES PATENTS

| 585,377 | Craig | June 29, 1897 |
| 862,867 | Eggleston | Aug. 6, 1907 |
| 1,729,664 | Ferguson | Oct. 1, 1929 |
| 1,839,257 | Pfau | Jan. 5, 1932 |
| 2,082,940 | Brisbane et al. | June 8, 1937 |
| 2,113,416 | Warren | Apr. 5, 1938 |
| 2,189,475 | Saur | Feb. 6, 1940 |
| 2,731,980 | Diefenderfer | Jan. 24, 1956 |

FOREIGN PATENTS

| 2,476 | Great Britain | of 1868 |